E. J. TERRY.
BALL COCK FOR WATER CLOSET TANKS.
APPLICATION FILED JULY 1, 1919.
1,343,421. Patented June 15, 1920.
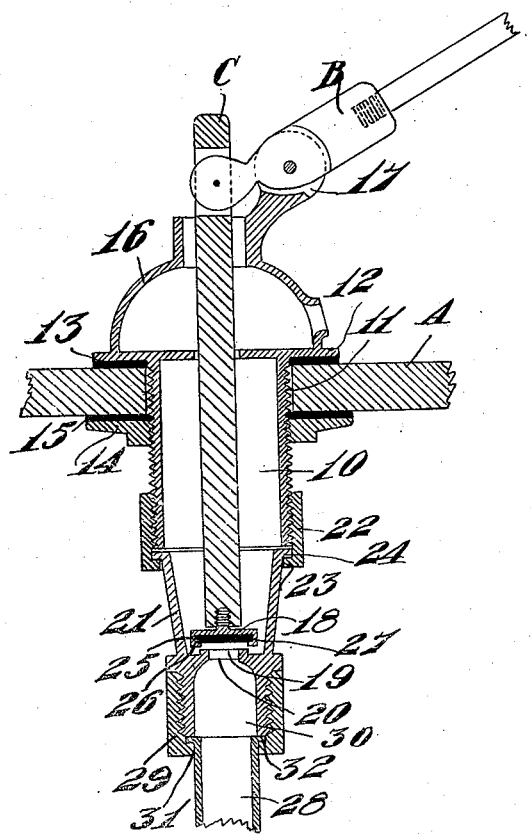
INVENTOR
EDGAR J. TERRY
BY Fetherstonhaugh & Co
ATTY'S.

UNITED STATES PATENT OFFICE.

EDGAR JOHN TERRY, OF ST. JOHN, NEW BRUNSWICK, CANADA.

BALL-COCK FOR WATER-CLOSET TANKS.

1,343,421.  Specification of Letters Patent. Patented June 15, 1920.

Application filed July 1, 1919. Serial No. 307,991.

*To all whom it may concern:*

Be it known that I, EDGAR JOHN TERRY, a subject of the King of Great Britain, and resident of the city of St. John, in the Province of New Brunswick, Dominion of Canada, have invented certain new and useful Improvements in Ball-Cocks for Water-Closet Tanks, of which the following is a specification.

This invention relates to improvements in ball clocks for water closet tanks, and the objects of the invention are to provide a simple and effective form of cock in which it will be possible to renew the washer or repair the seat without working in the interior of the tank.

Further objects are to generally simplify and improve the construction of the valve and the working parts thereof to better perform the functions required of them, and it consists essentially of the improved construction and arrangement of parts hereinafter described in detail in the accompanying specification and drawings.

The drawing shows a sectional elevation through an embodiment of the invention.

Referring to the drawings, A represents the bottom of a water closet tank. 10 indicates a screw threaded sleeve or shank extending through an opening 11 in the bottom of the tank having a flange 12 at the top which extends over the inside of the bottom of the tank and fits against a washer 13 between the flange and the bottom of the tank, the sleeve or shank being retained in position by means of a clamping or jam nut 14 which engages with the exterior of the screw threaded sleeve and between which and the outside of the bottom of the tank a washer 15 is provided.

16 represents a bracket member which is formed integral with the portion of the ball cock proper disposed inside of the tank and connected to the outer part of the flange 12 being formed at the top with a projecting lug 17 to which the float lever B is pivoted, the outer extremity of the float lever being pivoted to a float (not shown). The inner end of the float lever is connected to the valve stem C, the lower end of which carries a disk valve 18 which closes against the seat 19 controlling the inlet port 20 which is formed at the bottom of a tapered sleeve 21, which sleeve is connected to the sleeve 10 by means of a connecting collar or coupling 22 having screw threaded engagement with the sleeve 10 and being formed with an interior flange 23 at one end which engages a flange 24 at the end of the sleeve 21.

The valve 18 comprises a sleeve like member 25 having an internal flange 26 around its edge which retains a packing disk or washer 27 in position. The disk may be constructed of rubber, leather or other suitable material.

The lower part of the sleeve 21 is connected to the water pipe 28 by a suitable means such as a coupling sleeve 29 which has a screw threaded engagement with the exterior of a projecting neck 30 on the sleeve 21, the coupling member 29 being formed at one end with a flange 31 which engages a flange 32 on the water pipe.

It will be seen that the valve is of a simple yet strong form which is not likely to get out of order. When the washer or disk 26 becomes worn the coupling members 22 and 29 may be released permitting removal of the sleeve 21 and permitting free access to be had to renew the washer. If desired the valve member 18 itself may be removed and replaced.

One of the characteristic features of the invention and which has considerable utility in practice is the location of the seat of the ball cock outside of the tank, since this location enables the seat to be inspected or repaired without the additional work which would be necessary to gain access to the seat if it were located within the tank.

As many changes could be made in the above construction, and many apparently widely different embodiments of my invention within the scope of the claim, constructed without departing from the spirit or scope thereof, it is intended that all matter contained in the accompanying specification and drawings shall be interpreted as illustrative and not in a limiting sense.

What I claim as my invention is—

A valve structure for the purpose specified comprising an externally-threaded sleeve extending through the wall of a water closet tank, a valve seat containing sleeve equipped with a flanged end fitting against the end of the first-mentioned sleeve, a water supply pipe equipped with a flanged end fitting against the opposite end of the seat containing sleeve, a coupling member threadedly engaged with the first-mentioned sleeve and adapted to clamp the flanged end of the second-mentioned sleeve thereto, a coupling member threadedly engaged with the opposite end of the second-mentioned sleeve and adapted to clamp the flanged end of the water supply pipe thereto, said coupling members being so arranged that when unthreaded or released, they will permit removal of the seat container sleeve from between the first-mentioned sleeve and the water supply pipe, a valve engageable with the valve seat, and means for operating the valve supported by the first-mentioned sleeve.

In witness whereof I have hereunto set my hand in the presence of two witnesses.

EDGAR JOHN TERRY.

Witnesses:
  HARRY S. CULVER,
  I. E. MILLIAGE.